United States Patent
China et al.

(10) Patent No.: US 11,865,886 B2
(45) Date of Patent: Jan. 9, 2024

(54) SUSPENSION

(71) Applicant: SUBARU CORPORATION, Tokyo (JP)

(72) Inventors: Yuta China, Tokyo (JP); Koichi Uchikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 162 days.

(21) Appl. No.: 17/487,828

(22) Filed: Sep. 28, 2021

(65) Prior Publication Data
US 2022/0105766 A1 Apr. 7, 2022

(30) Foreign Application Priority Data
Oct. 1, 2020 (JP) .................. 2020-167195

(51) Int. Cl.
*B60G 15/06* (2006.01)
*B60G 11/14* (2006.01)
*F16F 1/12* (2006.01)

(52) U.S. Cl.
CPC ...... *B60G 15/063* (2013.01); *B60G 2202/312* (2013.01); *B60G 2204/1242* (2013.01); *B60G 2800/162* (2013.01)

(58) Field of Classification Search
CPC ............ B60G 15/063; B60G 2202/312; B60G 2204/1242; B60G 2800/162; B60G 11/14; B60G 2204/124; B60G 2206/70; F16F 2230/0005; F16F 1/121; F16F 1/12; F16F 3/12
See application file for complete search history.

(56) References Cited

U.S. PATENT DOCUMENTS

| | | | | | |
|---|---|---|---|---|---|
| 5,421,565 | A | * | 6/1995 | Harkrader | B60G 11/16 267/221 |
| 5,676,355 | A | * | 10/1997 | Hayashi | F16F 9/38 267/221 |
| 6,179,309 | B1 | * | 1/2001 | Satou | B60G 3/20 280/124.179 |

(Continued)

FOREIGN PATENT DOCUMENTS

JP 2001-026208 A 1/2001

*Primary Examiner* — Robert A. Siconolfi
*Assistant Examiner* — James K Hsiao
(74) *Attorney, Agent, or Firm* — MCGINN I.P. LAW GROUP, PLLC

(57) ABSTRACT

A suspension includes a coil spring, a shock absorber, a spring seat, and at least three strongly pressing parts. The coil spring elastically receives vertical movement of a wheel relative to a vehicle body. The shock absorber damps the vertical movement. The spring seat is provided in the shock absorber. The sprint seat supports an axial end of the coil spring. The coil spring is in direct or indirect contact with the spring seat over a predetermined distance from an end to a point of separation of the coil spring. The strongly pressing parts are provided in the spring seat. The strongly pressing parts apply contact pressures higher than contact pressure applied by other part, to the coil spring. The point of separation is disposed at a region that is between the strongly pressing parts and has the largest opening angle about an axial center of the shock absorber.

20 Claims, 5 Drawing Sheets

(56) References Cited

U.S. PATENT DOCUMENTS

| | | | | |
|---|---|---|---|---|
| 6,260,836 B1* | 7/2001 | Aoyama | B60G 15/063 | 267/221 |
| 6,273,407 B1* | 8/2001 | Germano | B60G 15/07 | 267/221 |
| 6,869,067 B2* | 3/2005 | Duval | F16F 1/126 | 267/179 |
| 7,806,392 B2* | 10/2010 | Ishikawa | B60G 15/068 | 267/221 |
| 9,234,555 B2 | 1/2016 | Nakamura | F16F 1/122 | |
| 9,334,913 B2 | 5/2016 | Schüssler | B60G 11/14 | |
| 9,586,453 B2 | 3/2017 | Mizukoshi | F16F 1/122 | |
| 9,777,787 B2 | 10/2017 | Teichmann | F16F 1/06 | |
| 9,895,948 B2* | 2/2018 | Paulding | B60G 11/52 | |
| 10,005,334 B2* | 6/2018 | Ando | B60G 15/063 | |
| 2004/0094879 A1* | 5/2004 | Duval | F16F 1/024 | 267/33 |
| 2006/0131119 A1* | 6/2006 | Ishikawa | F16F 1/13 | 188/321.11 |
| 2008/0224371 A1* | 9/2008 | Brand | B60G 15/063 | 267/221 |
| 2010/0289199 A1* | 11/2010 | Lee | B60G 11/16 | 267/286 |
| 2011/0140327 A1* | 6/2011 | Imaizumi | F01L 3/10 | 267/174 |
| 2014/0225319 A1* | 8/2014 | Schussler | B60G 15/062 | 156/60 |
| 2014/0265081 A1* | 9/2014 | Nakano | B60G 15/06 | 267/220 |
| 2016/0031280 A1* | 2/2016 | Arano | B60G 15/065 | 267/219 |
| 2016/0052358 A1* | 2/2016 | Itsuji | B60G 11/52 | 267/33 |
| 2016/0333956 A1* | 11/2016 | Teichmann | F16F 1/06 | |
| 2017/0015171 A1* | 1/2017 | Enomoto | B60G 11/14 | |
| 2018/0038437 A1* | 2/2018 | Ohmura | B60G 11/16 | |
| 2018/0045263 A1* | 2/2018 | Ohmura | F16F 9/512 | |
| 2018/0086166 A1* | 3/2018 | Miwa | B60G 15/06 | |
| 2018/0100556 A1* | 4/2018 | Love | B60G 15/063 | |
| 2018/0105003 A1* | 4/2018 | Miwa | F16F 9/32 | |
| 2018/0105004 A1* | 4/2018 | Miwa | B60G 15/063 | |
| 2019/0152361 A1* | 5/2019 | Matsushita | B60G 11/16 | |
| 2019/0160906 A1* | 5/2019 | Umeno | B60G 11/14 | |
| 2020/0391565 A1* | 12/2020 | Ogiso | F16F 1/12 | |
| 2020/0400205 A1* | 12/2020 | Ogiso | F16F 1/126 | |

* cited by examiner

PASSING POINT OF LOAD AXIS OF
SPRING SEAT ON LOWER END SIDE

SUSPENSION

CROSS-REFERENCE TO RELATED APPLICATIONS

The present application claims priority from Japanese Patent Application No. 2020-167195 filed on Oct. 1, 2020 the entire contents of which are hereby incorporated by reference.

BACKGROUND

The disclosure relates to a suspension in which an axial end of a coil spring is supported by a spring seat that is provided in a shock absorber.

One of suspensions of this kind that has been developed has a configuration in which a coil spring is supported by a spring seat that is fitted to a shock absorber via a mounting part, while the coil spring is disposed by offsetting a line of action of load relative to an axial center of the shock absorber (for example, refer to Japanese Unexamined Patent Application Publication (JP-A) No. 2001-26208). In the suspension disclosed in JP-A No. 2001-26208, three protrusions are provided on a spring contact surface in contact with a winding up end of the coil spring, along the spiral direction of the coil spring, and the winding up end of the coil spring is placed on the three protrusions. In addition, a center of gravity of a triangle having the three protrusions as apexes is set so as to coincide with the line of action of load of the coil spring.

SUMMARY

An aspect of the disclosure provides a suspension to be applied to a vehicle. The suspension includes a coil spring, a shock absorber, a spring seat, and at least three strongly pressing parts. The coil spring is configured to elastically receive vertical movement of a wheel relative to a vehicle body of the vehicle. The shock absorber is configured to damp the vertical movement. The spring seat is provided in the shock absorber. The sprint seat supports an axial end of the coil spring. The coil spring is in direct or indirect contact with the spring seat over a predetermined distance from an end of the coil spring to a point of separation of the coil spring. The least three strongly pressing parts are provided in the spring seat. The strongly pressing parts are configured to apply contact pressures higher than contact pressure applied by other part, to the coil spring. The point of separation is disposed at a region between the strongly pressing parts. The region has the largest opening angle about an axial center of the shock absorber, among regions between the strongly pressing parts that are adjacent to each other.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

In suspensions, a contact pressure that is applied from a spring seat to a coil spring is relatively high at a part on a side opposite to a point of separation from the spring seat of the coil spring, relative to an axial center of a shock absorber, in a top view, in the contact region between the spring seat and the coil spring. However, a positional relationship between a point of separation and each protrusion is not considered in the suspension disclosed in JP-A No. 2001-26208. Thus, a load may be unevenly applied to one or some of the protrusions in compressing the coil spring, and a reaction force of the coil spring may be generated in an unintentional direction. This may generate an unexpected lateral force in the shock absorber, resulting in unsmooth sliding of the shock absorber or change in a steering force.

It is desirable to provide a suspension that is able to stably support a coil spring without causing a load to be unevenly applied to a part in direct or indirect contact with a spring seat of the coil spring.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
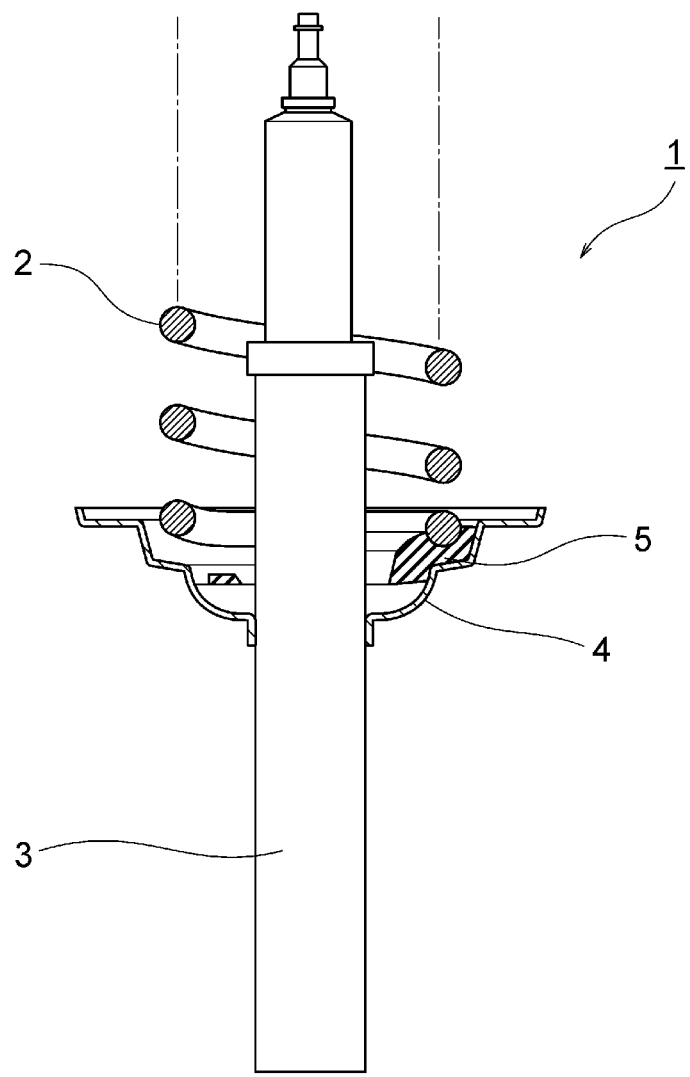
FIG. 1 is a schematic side sectional view of a suspension and illustrates an embodiment of the disclosure.
Figure 2:
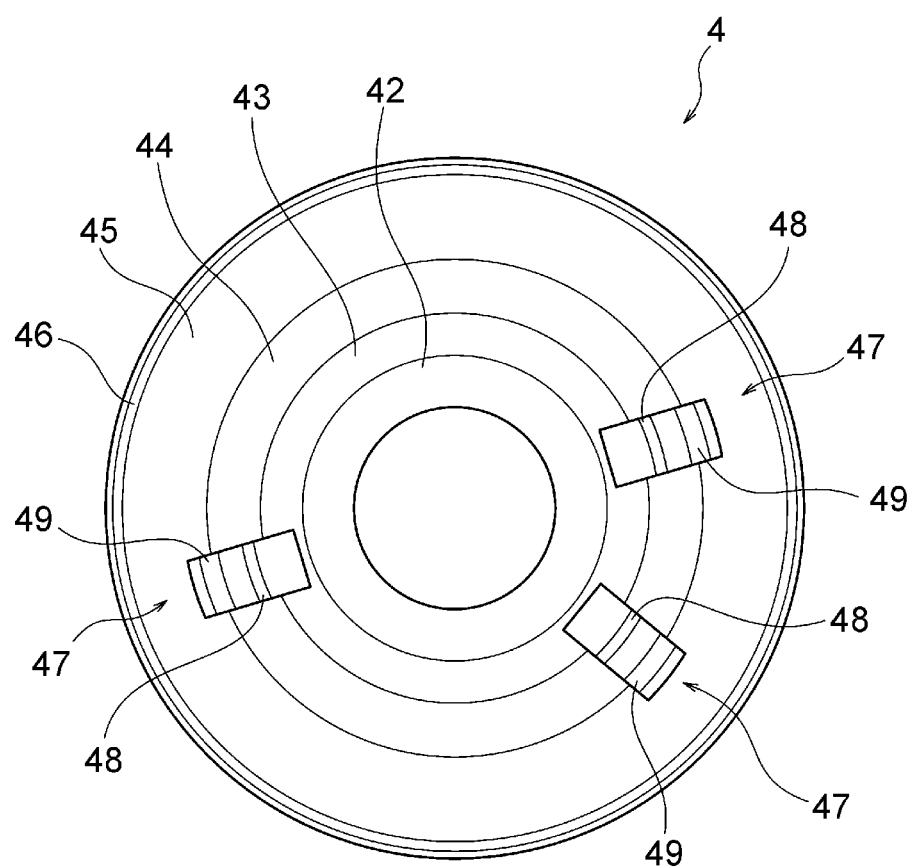
FIG. 2 is a top view of a spring seat.
Figure 3:
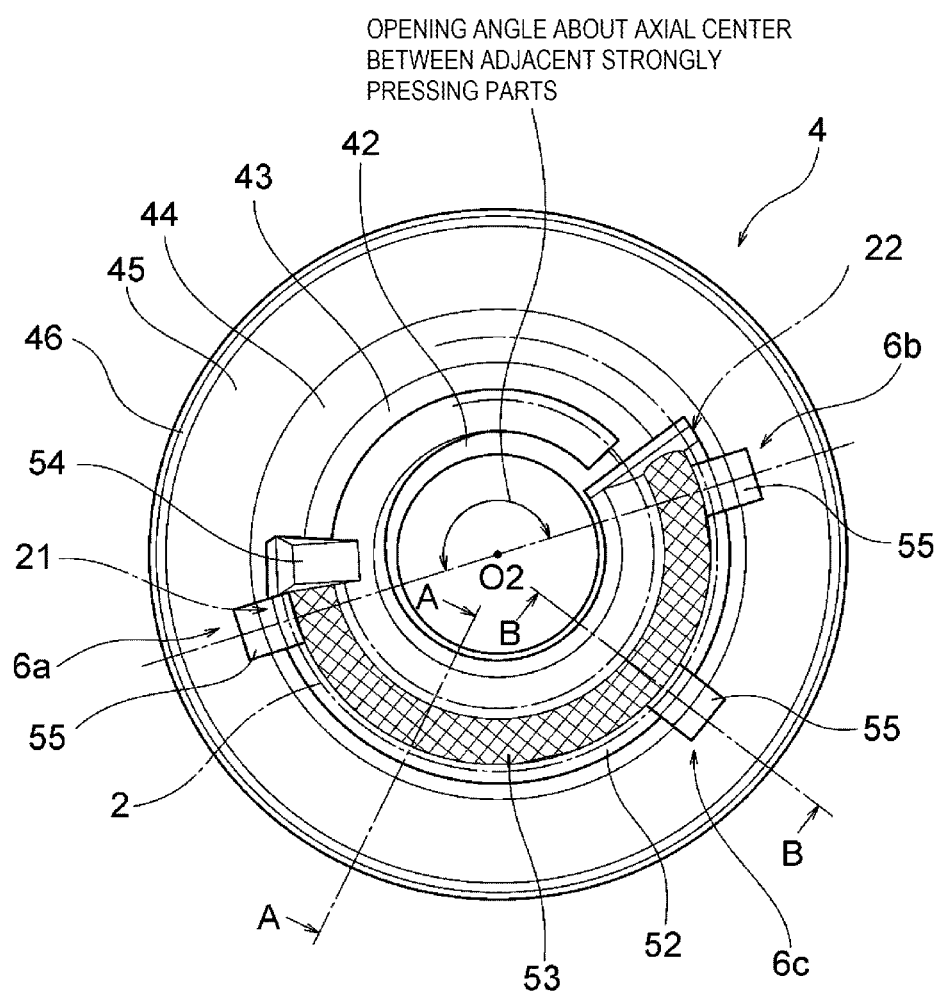
FIG. 3 is a top view of the spring seat on which a rubber sheet is placed.
Figure 4:
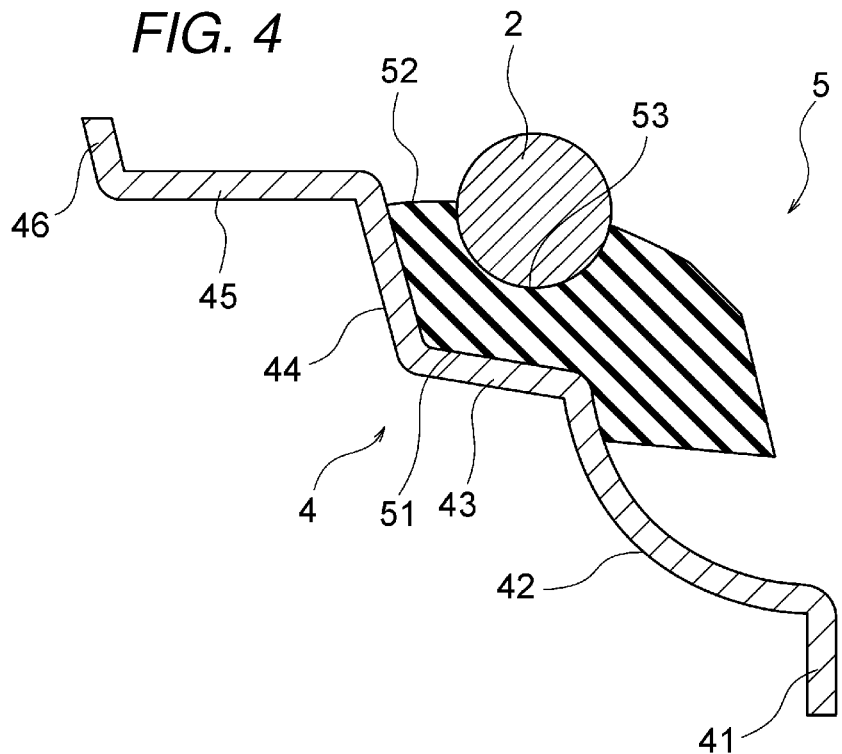
FIG. 4 is an A-A sectional view of FIG. 3.
Figure 5:
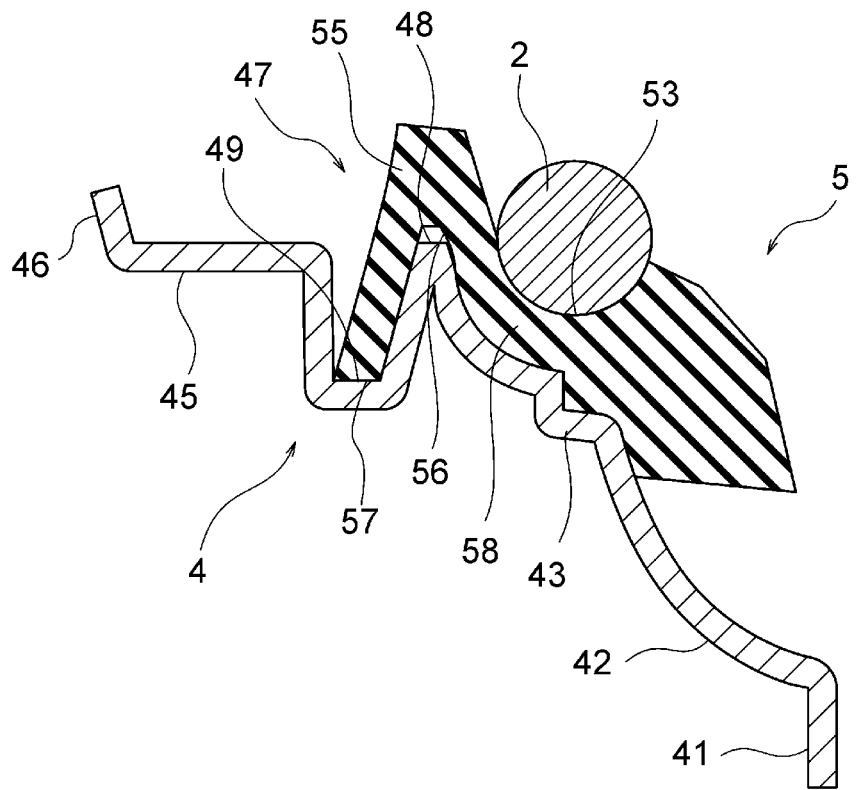
FIG. 5 is a B-B sectional view of FIG. 3.
Figure 6:
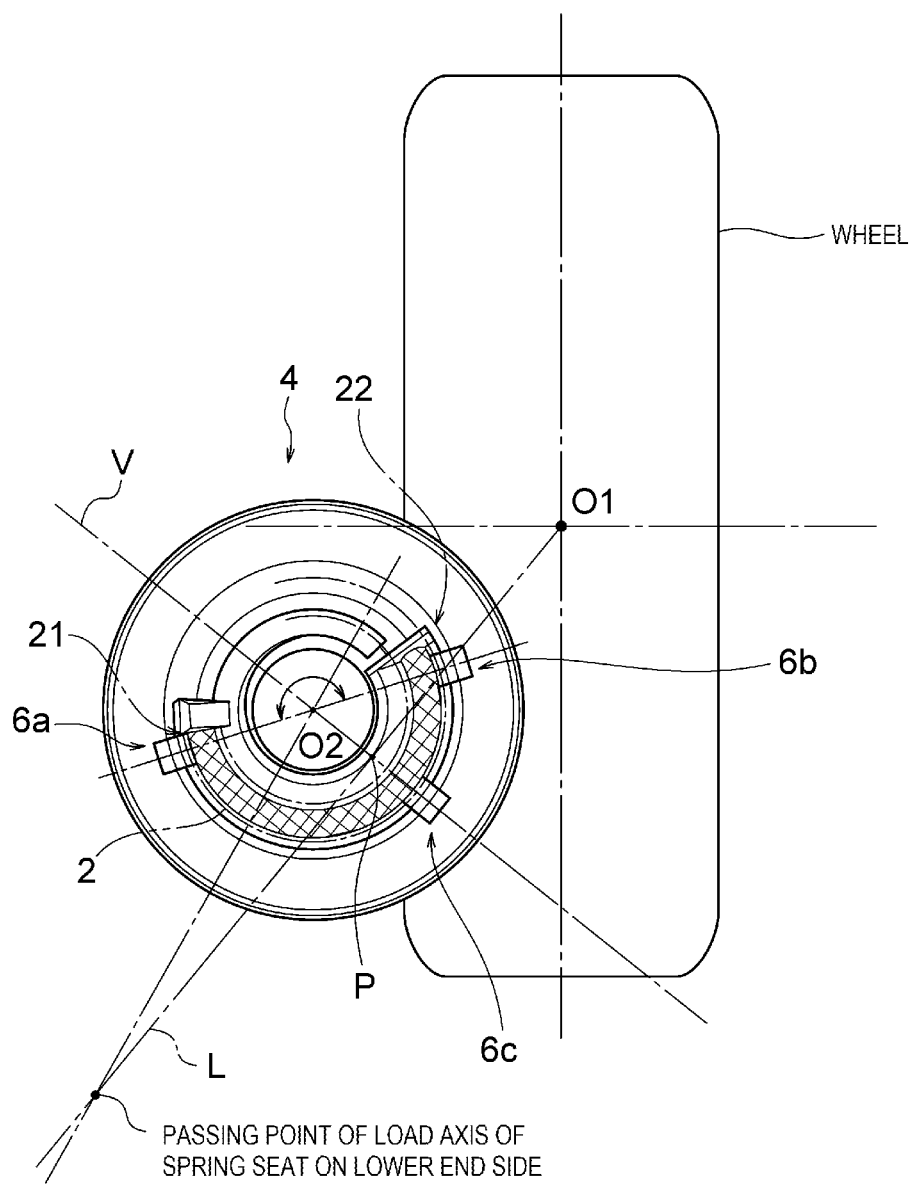
FIG. 6 is a top view illustrating a positional relationship between a wheel and the spring seat.

FIGS. 1 to 6 illustrate the embodiment of the disclosure. FIG. 1 is a schematic side sectional view of a suspension. FIG. 2 is a top view of a spring seat. FIG. 3 is a top view of the spring seat on which a rubber sheet is placed. FIG. 4 is an A-A sectional view of FIG. 3. FIG. 5 is a B-B sectional view of FIG. 3. FIG. 6 is a top view illustrating a positional relationship between a wheel and the spring seat.

As illustrated in FIG. 1, a suspension 1 includes a coil spring 2 and a shock absorber 3. The coil spring 2 is to be disposed between a vehicle body of a vehicle and a wheel and to elastically receive vertical movement of the wheel relative to the vehicle body. The shock absorber 3 is disposed inside the coil spring 2 and damps the vertical movement. An upper end of the shock absorber 3 is configured to be mounted to a mount that is fixed to the vehicle body. A lower end of the shock absorber 3 is provided with a bracket that is to be coupled to a wheel side part. The shock absorber 3 is provided with a spring seat 4 for supporting a lower end of the coil spring 2 and a spring seat (not illustrated) for supporting an upper end of the coil spring 2. The coil spring 2 is held between the upper and the lower spring seats in a pressurized manner. The suspension 1 of this embodiment is what is called a strut suspension and is used for a front wheel of an automobile vehicle. In this embodiment, the suspension 1 also includes a rubber sheet 5 (an elastic member 5) that is interposed between the coil spring 2 and the lower spring seat 4. The lower spring seat 4 indirectly supports the coil spring 2 via the rubber sheet 5.

As illustrated in FIG. 2, the spring seat 4, which supports the lower end of the coil spring 2, is formed into a circle in a plane view. As illustrated in FIG. 3, the spring seat 4 is in contact with the coil spring 2 via the rubber sheet 5 over a predetermined distance from an end 21 of the coil spring 2 to a point 22 of separation of the coil spring 2 from the rubber sheet 5. That is, the coil spring 2 may separate from the rubber sheet 5 at the point 22 of separation of the coil spring 2. The end 21 of the coil spring 2 may be a winding start of the coil spring 2. The part in contact with the coil spring 2 of the rubber sheet 5 is illustrated by cross hatching in FIG. 3. The spring seat 4 is formed into a dish shape that is upwardly extended, as a whole. In one example, as illustrated in FIG. 4, the spring seat 4 includes a fixed part 41, a first inclined part 42, a first horizontal part 43, a second inclined part 44, a second horizontal part 45, and a flange 46. The fixed part 41 is fixed to an outer cylinder of the shock absorber 3. The first inclined part 42 extends obliquely upward from an upper end of the fixed part 41 toward a radial outside. The first horizontal part 43 extends approximately horizontally from a radial outer end of the first inclined part 42. The second inclined part 44 extends obliquely upward from a radial outer end of the first horizontal part 43 toward the radial outside. The second horizontal part 45 extends approximately horizontally from a radial outer end of the second inclined part 44. The flange 46 extends upward from a radial outer end of the second horizontal part 45.

As illustrated in FIG. 2, the spring seat 4 includes three strongly pressing shapes 47 that are arranged at intervals in the circumferential direction. The strongly pressing shapes 47 apply contact pressures higher than that applied by other part, to the coil spring 2. As illustrated in FIG. 5, each of the strongly pressing shapes 47 is provided from the first horizontal part 43 to the second horizontal part 45 and includes a protrusion 48 and a recess 49. The protrusion 48 protrudes upward of the first horizontal part 43. The recess 49 is formed continuously with the protrusion 48 on the radial outside and is recessed downward of the second horizontal part 45. In this embodiment, each of the protrusions 48 supports a radial outer side on the lower end side of the coil spring 2 via the rubber sheet 5.

As illustrated in FIG. 3, the rubber sheet 5 is provided from a radial outside of the first inclined part 42 to a radial inside of the second inclined part 44 of the spring seat 4. As illustrated in FIG. 4, a lower surface 51 of the rubber sheet 5 extends along from the first inclined part 42 to the second inclined part 44. In addition, an upper surface 52 of the rubber sheet 5 includes a groove 53 and an abutting part 54. The groove 53 receives a lower side of the coil spring 2 and has a predetermined length in the circumferential direction. The abutting part 54 is formed continuously with an end of the groove 53 and protrudes upward. As illustrated in FIG. 3, the coil spring 2 is in contact with the abutting part 54 at the end 21 and is separated from the rubber sheet 5 at the other end of the groove 53. It is noted that the coil spring 2 is illustrated by an alternate long and short dash line in FIG. 3. The rubber sheet 5 also includes protrusions 55 that protrude radially outward at positions corresponding to the strongly pressing shapes 47 of the spring seat 4, in a top view.

As illustrated in FIG. 5, the lower surface 51 of the rubber sheet 5 extends along the strongly pressing shape 47 at the part having the strongly pressing shape 47 of the spring seat 4. That is, a recess 56 and a protrusion 57 that respectively correspond to the protrusion 48 and the recess 49 of the strongly pressing shape 47 are formed on the rubber sheet 5. The recess 56 and the protrusion 57 of the rubber sheet 5 are respectively fitted to the protrusion 48 and the recess 49 of the spring seat 4. In addition, the part having the recess 56 of the rubber sheet 5 is thinned more than other part so as to form a thinned-wall part 58. In this embodiment, the protrusions 48 of the spring seat 4 and the thinned-wall part 58 of the rubber sheet 5 constitute strongly pressing parts 6a, 6b, and 6c for applying contact pressures higher than that applied by other part, to the coil spring 2.

As illustrated in FIG. 6, a tread center O1 of a wheel and an axial center position O2 on the lower spring seat 4 of the shock absorber 3 do not coincide with each other in a top view, in accordance with the layout of the suspension 1, settings of camber and caster, and so on. In addition, a load axis L of the coil spring 2 is set in such a manner as to be tilted downward toward the tread center O1 of the wheel, relative to the axial center of the shock absorber 3. In this embodiment, the three strongly pressing parts 6a, 6b, and 6c are provided in the lower spring seat 4.

In one embodiment, the first strongly pressing part 6a is provided at a position corresponding to the end 21 of the coil spring 2 in the top view. The second strongly pressing part 6b is provided on a side opposite to the first strongly pressing part 6a, across the axial center position O2 on the lower spring seat 4 in the top view. The third strongly pressing part 6c is provided on a virtual line V in the top view. The virtual line V passes a midpoint of a line segment connecting the first strongly pressing part 6a and the second strongly pressing part 6b and also passes a passing point P of the load axis L of the coil spring 2 on the lower spring seat 4. In this embodiment, the midpoint of the line segment connecting the first strongly pressing part 6a and the second strongly pressing part 6b coincides with the axial center position O2 on the spring seat 4 of the shock absorber 3. As illustrated in FIG. 3, the point 22 of separation from the spring seat 4 of the coil spring 2 is disposed at a region between the first strongly pressing part 6a and the second strongly pressing part 6b that have the largest opening angle about the axial center position O2, among regions between the adjacent strongly pressing parts 6a, 6b, and 6c. In this embodiment, the opening angle about the axial center position O2 is 180 degrees, and the first strongly pressing part 6a and the second strongly pressing part 6b are disposed at mutually opposite positions across the axial center position O2.

In the suspension 1 thus configured, a contact pressure that is applied from the spring seat 4 to the coil spring 2 is relatively high at a part on a side opposite to the point 22 of separation from the spring seat 4 of the coil spring 2, relative to the axial center position O2 of the shock absorber 3, in the top view, in the contact region between the spring seat 4 and the coil spring 2. In this embodiment, the point 22 of separation from the spring seat 4 of the coil spring 2 is disposed between the strongly pressing parts 6a and 6b, which have the largest opening angle about the axial center position O2. Thus, a load that is applied by the coil spring 2 is biased to a side on which the strongly pressing parts 6a, 6b, and 6c are relatively densely disposed on the spring seat 4. This prevents the contact pressure of one or some of the strongly pressing parts 6a, 6b, and 6c from being excessive and enables the contact pressures of the strongly pressing parts 6a, 6b, and 6c to be brought close to each other. Thus, it is possible to prevent a reaction force of the coil spring 2 from being in an unintentional direction due to set positions of the strongly pressing parts 6a, 6b, and 6c, machining accuracy of the coil spring 2, and so on, whereby occurrence of an unexpected lateral force in the shock absorber 3 can be avoided. As a result, increase in sliding resistance and change in steering force do not tend to occur.

In this embodiment, the first strongly pressing part 6a is provided at the position corresponding to the end 21 of the coil spring 2, among the three strongly pressing parts 6a, 6b, and 6c. This structure appropriately supports the end 21 of the coil spring 2 on the spring seat 4 side. The third strongly pressing part 6c is provided on the virtual line V. Thus, the center of gravity of the triangle having the three strongly pressing parts 6a, 6b, and 6c as apexes is made close to the load axis L of the coil spring 2, whereby a load acting on each of the strongly pressing parts 6a, 6b, and 6c from the coil spring 2 is appropriately distributed.

In this embodiment, the recess 56 and the protrusion 57 of the rubber sheet 5 are fitted to the protrusion 48 and the recess 49 of the spring seat 4. This structure prevents the rubber sheet 5 from sliding on the spring seat 4 at the time of applying a vertical force, turning a steering wheel, or the like. The protrusion 48 of the spring seat 4, which is provided on the radial outside of the coil spring 2, prevents deformation of the coil spring 2 toward the radial outside in compressing.

It is noted that the position of each of the strongly pressing parts 6a, 6b, and 6c in the embodiment can be changed as desired. In the embodiment, the three strongly pressing parts 6a, 6b, and 6c are provided. However, the number of the strongly pressing parts may be four or more. The positions of the strongly pressing parts may be changed, and the number of the strongly pressing parts may be set to four or more. In each case, on the condition that the point 22 of separation is disposed between the strongly pressing parts that have the largest opening angle about the axial center position O2, it is possible to bring the contact pressures of the strongly pressing parts close to each other, resulting in generation of a reaction force of the coil spring 2 in a desired direction. In the embodiment, the disclosure is used in the spring seat 4 that supports the lower end of the coil spring 2. However, the disclosure can also be used in a spring seat that supports the upper end of the coil spring 2.

In the embodiment, the protrusion 48 of the spring seat 4 and the thinned-wall part 58 of the rubber sheet 5 constitute the strongly pressing part 6. However, either one of the protrusion 48 and the thinned-wall part 58 can serve as the strongly pressing part 6. The protrusion 48 supports the radial outer side on the lower end side of the coil spring 2, but the protrusion 48 may support any part on the lower end side of the coil spring 2. Moreover, the strongly pressing part 6 can be composed of elements other than the protrusion 48 and the thinned-wall part 58.

In the embodiment, the rubber sheet 5 is interposed between the coil spring 2 and the spring seat 4. However, the coil spring 2 and the spring seat 4 may be in direct contact with each other without having the rubber sheet 5. In the case, the spring seat 4 may be in contact with the coil spring 2 over a predetermined distance from an end 21 of the coil spring 2 to a point of separation of the coil spring 2 from the spring seat 4. The coil spring 2 may separate from the spring seat 4 at the point of separation of the coil spring 2.

Although the embodiment of the disclosure is described above, the foregoing embodiment does not limit the disclosure according to the scope of the claims. In addition, it is noted that one or some of the combinations of the features described in the embodiment may be omitted in the technique for solving the problem of the disclosure.

The suspension of the disclosure enables stably supporting a coil spring without causing a load to be unevenly applied to a part in direct or indirect contact with a spring seat of the coil spring.

The invention claimed is:

1. A suspension to be applied to a vehicle, the suspension comprising:
   a coil spring configured to elastically receive vertical movement of a wheel relative to a vehicle body of the vehicle;
   a shock absorber configured to damp the vertical movement;
   a spring seat provided in the shock absorber, the spring seat supporting an axial end of the coil spring, the coil spring being in direct or indirect contact with the spring seat over a predetermined distance from an end of the coil spring to a point of separation of the coil spring; and
   at least three strongly pressing parts provided in the spring seat, the strongly pressing parts being configured to apply contact pressures higher than contact pressure applied by another part of the spring seat, to the coil spring, wherein
   the point of separation is disposed at a region between the strongly pressing parts, the region having the largest opening angle about an axial center of the shock absorber, among regions between the strongly pressing parts that are adjacent to each other,
   wherein a load that is applied by the coil spring is biased to a side on which the strongly pressing parts are more densely disposed on the spring seat.

2. The suspension according to claim 1, wherein each of the strongly pressing parts comprises a protrusion that is formed on the spring seat.

3. The suspension according to claim 2, wherein each of the protrusions supports a radial outer side of the axial end of the coil spring.

4. The suspension according to claim 3, wherein
   the strongly pressing parts comprise three strongly pressing parts that are respectively provided at three positions,
   two of the strongly pressing parts on outer sides have the largest opening angle about the axial center of the shock absorber,
   the other strongly pressing part on an inner side is provided on a virtual line, and
   the virtual line passes a midpoint of a line segment connecting the two strongly pressing parts on the outer sides and also passes a passing point of a load axis of the coil spring on the spring seat, in the top view.

5. The suspension according to claim 2, wherein one of the strongly pressing parts is provided at a position corresponding to the end of the coil spring, in a top view.

6. The suspension according to claim 5, wherein
   the strongly pressing parts comprise three strongly pressing parts that are respectively provided at three positions,
   two of the strongly pressing parts on outer sides have the largest opening angle about the axial center of the shock absorber,
   the other strongly pressing part on an inner side is provided on a virtual line, and
   the virtual line passes a midpoint of a line segment connecting the two strongly pressing parts on the outer sides and also passes a passing point of a load axis of the coil spring on the spring seat, in the top view.

7. The suspension according to claim 2, wherein
the strongly pressing parts comprise three strongly pressing parts that are respectively provided at three positions,
two of the strongly pressing parts on outer sides have the largest opening angle about the axial center of the shock absorber,
the other strongly pressing part on an inner side is provided on a virtual line, and
the virtual line passes a midpoint of a line segment connecting the two strongly pressing parts on the outer sides and also passes a passing point of a load axis of the coil spring on the spring seat, in the top view.

8. The suspension according to claim 1, wherein one of the strongly pressing parts is provided at a position corresponding to the end of the coil spring, in a top view.

9. The suspension according to claim 8, wherein
the strongly pressing parts comprise three strongly pressing parts that are respectively provided at three positions,
two of the strongly pressing parts on outer sides have the largest opening angle about the axial center of the shock absorber,
the other strongly pressing part on an inner side is provided on a virtual line, and
the virtual line passes a midpoint of a line segment connecting the two strongly pressing parts on the outer sides and also passes a passing point of a load axis of the coil spring on the spring seat, in the top view.

10. The suspension according to claim 1, wherein
the strongly pressing parts comprise three strongly pressing parts that are respectively provided at three positions,
two of the strongly pressing parts on outer sides have the largest opening angle about the axial center of the shock absorber,
the other strongly pressing part on an inner side is provided on a virtual line, and
the virtual line passes a midpoint of a line segment connecting the two strongly pressing parts on the outer sides and also passes a passing point of a load axis of the coil spring on the spring seat, in the top view.

11. A vehicle, comprising:
a suspension including:
  a resilient member configured to elastically receive vertical movement of a wheel relative to a vehicle body of the vehicle;
  a shock absorber configured to dampen at least the vertical movement;
  a spring seat provided in the shock absorber, the spring seat supporting an axial end of the resilient member, the resilient member being in contact with the spring seat over a predetermined distance from an end of the resilient member to a point of separation of the resilient member; and
  a plurality of strongly pressing parts provided in the spring seat, the strongly pressing parts being configured to apply contact pressures higher than contact pressure applied by another part of the spring seat, to the resilient member, wherein
  the point of separation is disposed at a region between the strongly pressing parts, the region having the largest opening angle about an axial center of the shock absorber, among regions between the strongly pressing parts that are adjacent to each other, and
  wherein a load that is applied by the resilient member is biased to a side on which the strongly pressing parts are more densely disposed on the spring seat.

12. The vehicle according to claim 11, wherein each of the strongly pressing parts comprises a protrusion that is formed on the spring seat.

13. The vehicle according to claim 12, wherein each of the protrusions supports a radial outer side of the axial end of the resilient member.

14. The vehicle according to claim 12, wherein one of the strongly pressing parts is provided at a position corresponding to the end of the resilient member, in a top view.

15. The vehicle according to claim 11, wherein one of the strongly pressing parts is provided at a position corresponding to the end of the resilient member, in a top view.

16. The vehicle according to claim 11, wherein
the strongly pressing parts comprise three strongly pressing parts that are respectively provided at three positions,
two of the strongly pressing parts on outer sides have the largest opening angle about the axial center of the shock absorber,
the other strongly pressing part on an inner side is provided on a virtual line, and
the virtual line passes a midpoint of a line segment connecting the two strongly pressing parts on the outer sides and also passes a passing point of a load axis of the resilient member on the spring seat, in the top view.

17. A suspension to be applied to a vehicle, the suspension comprising:
a coil spring configured to elastically receive vertical movement of a wheel relative to a vehicle body of the vehicle;
a shock absorber configured to damp the vertical movement;
a rubber sheet including an upper surface and a lower surface, the upper surface including a groove including a first end and a second end, the groove being in contact with the coil spring over a predetermined distance along a wire of the coil spring from an end of the wire of the coil spring to a point of separation of the coil spring, the first end of the groove being in contact with the end of the wire of the coil spring, the second end of the groove being in contact with the point of separation of the coil spring; and
a spring seat fixed to an outer cylinder of the shock absorber and including an upper surface that is in contact with a lower surface of a grooved region of the rubber sheet in which the groove is formed,
wherein the grooved region of the rubber sheet includes first, second and third thinned-wall parts located at separate locations along a longitudinal direction of the groove,
wherein a thickness of the grooved region of the rubber sheet at the first, second and third thinned-wall parts is less than a thickness of the grooved region of the rubber sheet outside the first, second and third thinned-wall parts, the thickness of the grooved region of the rubber sheet is a distance from a bottom of the groove to the lower surface of the grooved region of the rubber sheet,
wherein the first thinned-wall part is located below the end of the wire of the coil spring,
wherein the second thinned-wall part is located closer to the first thinned-wall part than the second end of the groove in the longitudinal direction of the groove, and wherein the third thinned-wall part is located between the first and second thinned-wall parts in the longitudinal direction of the groove.

18. The vehicle according to claim 17, wherein the upper surface of the spring seat includes first, second and third protrusions that are located below the first, second and third thinned-wall parts and protrude upward.

19. The vehicle according to claim 18, wherein the first and second thinned-wall parts are located at mutually opposite positions across the axial center position, and
third thinned-wall part is located closer to the second thinned-wall part than a center of the first and second thinned-wall parts in the longitudinal direction of the groove.

20. The vehicle according to claim 18, wherein
the first and second thinned-wall parts are located at mutually opposite positions across the axial center position,
the third thinned-wall part is located on a virtual line, and
the virtual line passes a midpoint of a line segment connecting the first and second thinned-wall parts and also passes a passing point of a load axis of the coil spring on the spring seat, in the top view.

* * * * *